United States Patent [19]
Davidson et al.

[11] Patent Number: 5,370,949
[45] Date of Patent: Dec. 6, 1994

[54] MATERIALS FOR USE AS CATHODES IN LITHIUM ELECTROCHEMICAL CELLS

[75] Inventors: Isobel J. Davidson, Orleans; Roderick S. McMillan; John J. Murray, both of Gloucester, all of Canada

[73] Assignee: National Research Council of Canada, Ottawa, Canada

[21] Appl. No.: 87,883

[22] Filed: Jul. 9, 1993

[51] Int. Cl.$^5$ ............................................. H01M 4/50
[52] U.S. Cl. ................................. 429/224; 423/596; 423/599
[58] Field of Search .................. 429/224; 423/596, 599

[56] References Cited

U.S. PATENT DOCUMENTS

| | | | |
|---|---|---|---|
| 4,125,687 | 11/1978 | DiSalvo et al. | 429/224 X |
| 4,567,031 | 1/1986 | Riley | 423/599 X |
| 5,084,366 | 1/1992 | Toyoguchi | 429/224 |

OTHER PUBLICATIONS

Hewston et al., "A Survey of First Row Ternary Oxides LiMO$_2$(M=Su—Cu)" *J. Phys. Chem. Solids vol. 48, No. 2, pp. 97–108 (1987) (Month Unavailable).*
Murphy et al., "Ternary Li$_x$TiO$_2$ Phases From Insertion Reactions" *Solid State Ionics* 9 and 10, 1983, pp. 413–418 (Month Unavailable).
Rossen et al., "Structure and Electrochemistry of Li$_x$Mn$_y$Ni$_{(1-y)}$O$_2$" *Solid State Ionics* 57 (1992) pp. 311–318 (Month Unavailable).
Remers et al., "Structure and Electrochemistry of Li$_x$Fe$_y$Ni$_{(1-y)}$O$_2$" *Solid State Ionics* 61 (1993) pp. 335–344 (Month Unavailable).
Tarascon et al., "Li Metal-Free Batteries Based on Li$_{(1+x)}$M$_2$O$_4$ Cathodes and Carbon Anodes" *Journal of the Electrochemical Society*, vol. 138, No. 10, Oct. 1991, pp. 2864–2868.
Rossen et al., "Synthesis and Electrochemistry of Spinel LT–LiCoO$_2$" *Solid State Ionics* 62 (1993) pp. 53–60 (Month Unavailable).

*Primary Examiner*—Stephen Kalafut

[57] ABSTRACT

The invention disclosed relates to a novel compound of molecular formula Li$_2$Cr$_x$Mn$_{2-x}$O$_4$, wherein $0<X<2$. This compound may be used as the active cathode material in secondary lithium ion cells. Secondary lithium ion cells including such cathodes are also described.

16 Claims, 4 Drawing Sheets

MATERIALS FOR USE AS CATHODES IN LITHIUM ELECTROCHEMICAL CELLS

SUMMARY OF THE INVENTION

This invention relates to a novel compound of molecular formula $Li_2Cr_xMn_{2-x}O_4$, wherein $0<x<2$, and to the use of this compound as a cathode material in secondary lithium ion cells.

The impetus for this invention was the recent, great increase in demand for batteries having high energy density and low weight, such as had already been achieved with metallic lithium systems, but which are also rechargeable. However, lithium electrodes do not meet this requirement over extended periods of time because even in an aprotic organic solvent the cycling stability is severely limited, and problems with cell safety arise.

DESCRIPTION OF THE PRIOR ART

One approach to improving the reversibility of metallic lithium electrodes involves the use of lithium intercalation compounds. The intercalation compound serves as a host structure for lithium ions which are either stored or released depending on the polarity of an externally applied potential. During discharge, the electromotive force reverses the forced intercalation or deintercalation thereby producing current.

Previous reports and patents on cathodes for lithium ion cells have proposed using various mixed oxides of lithium, such as $LiCoO_2$, $LiNiO_2$ and $LiMn_2O_4$ as the active material. Specifically, $LiCrO_2$ is too poor an electronic conductor to be useful in an electrochemical cell. Doping with a small amount of Mn (10% or perhaps less) dramatically improves the material's electronic conductivity as evidenced by its color. $LiCrO_2$ has an olive green color while $Li_2Cr_xMn_{2-x}O_4$ is dark brown to black in color for $0.1 \leq x < 2.0$. Both $LiMn_2O_4$ and $\lambda$-$Li_2Mn_2O_4$ have been used as cathodes in lithium ion cells. $\lambda$-$Li_2Mn_2O_4$ has twice the nominal capacity of $LiMn_2O_4$ but it is reported to be hydroscopic and metastable [A. Mosbah, A. Verbaere and M. Tournoux, *Mat. Res. Bull.*, 18 1375 (1983)]. $\lambda$-$Li_2Mn_2O_4$ converts to the orthorhombic form, $LiMnO_2$, at about 500° C. It is prepared by electrochemically, or chemically, intercalating lithium into the $LiMn_2O_4$ spinel structure. Doping $Li_2Mn_2O_4$ with Cr stabilizes the lambda structure. $Li_2Cr_xMn_{2-x}O_4$ with $0.1 \leq x \leq 1.25$, which can be prepared at 100° C., is less tetragonally distorted than $\lambda$-$Li_2Mn_2O_4$ but otherwise structurally similar. However, $Li_2Mn_{2-x}O_4$ with $0.1 \leq x \leq 1.25$ is simple to prepare, and is air and thermally stable. Greater chemical stability often results in enhanced safety in electrochemical cells. For example, see U.S. Pat. Nos. 4,983,276, 4,956,248, and 4,110,696.

The capacity of a lithium ion cell is limited by the quantity of lithium which can be reversibly removed (i.e. cycled) from the cathode. In the cathode materials of prior art, only about one half mole of lithium per transition metal can be removed reversibly. Thus, they have limited specific capacity, generally no more than about 140 mAh/g.

Moreover, the use of such phases as $LiMn_{2-x}Cr_xO_{4.35}$ where $0.2<x<0.4$, and $LiCr_xMn_{2-x}O_4$ where $0<x<1$, in secondary lithium batteries which have a metallic lithium anode, are also known. See G. Pistoia et al, Solid State Ionics, 58, 2885 (1992) and B. Wang et al, Studies of $LiCr_xMn_{2-x}O_4$ for Secondary Lithium Batteries, extended Abstract from the Sixth International Meeting on Lithium Batteries, Munster, Germany, May 10-15, 1992. The materials are described in the latter case as being of a cubic lattice structure. Also in the latter case, additional Li was inserted electrochemically. However, only an additional 0.4 mole equivalents of lithium could be inserted e.g. To provide an oxide of molecular formula $Li_{1.4}Cr_{0.4}Mn_{1.65}O_4$.

Also, a lithium-poor lithium-manganese spinel structure for use in secondary electrochemical cells, having a molecular formula of $Li_qM_xMn_yO_z$ where q is 0 to 1.3, is described in U.S. Pat. No. 5,169,736.

SUMMARY OF THE INVENTION

It is an object of the present invention to provide novel lithium oxide materials for use as the active material in cathodes for lithium ion electrochemical cells.

It is another object of the present invention to provide a secondary electrochemical cell of high energy density, whose charge/discharge mechanism is based upon alternating intercalation and deintercalation of $Li^+$ ions in the active materials of the positive and negative electrodes.

It is yet another object to provide good chemical resistance to the electrolyte and high cycling stability.

According to one aspect of the invention, a novel compound of molecular formula I $$Li_2Cr_{Mn2-x}O_4 \qquad \text{I}$$

wherein $0<x<2$, is provided.

According to another aspect of the invention, the use of a compound of molecular formula I as active cathode material in secondary lithium ion electrochemical cells is also provided.

According to yet another aspect of the invention, a secondary lithium ion electrochemical cell comprising a lithium intercalation anode, a suitable non-aqueous electrolyte, including a lithium salt, a cathode of a compound of formula I as defined above as active material, and a separator between anode and cathode is provided.

The anode of the present invention serves as the recipient for $Li^+$ ions. Accordingly, the anode can be of any intercalation compound which is capable of intercalating lithium and has an electrode potential sufficiently reducing to provide an adequate cell voltage over a range of lithium intercalation. Specific examples include transition metal oxides such as $MoO_2$ or $WO_2$[Auborn and Barberio, *J. Electrochem. Soc.* 134 638 (1987)], transition metal sulfides (see also U.S. Pat. No. 4,983,476) or carbon products obtained by the pyrolysis of organic compounds. As will be apparent hereinafter, various commercially available carbonaceous materials of predetermined structural characteristics have proven useful.

The cathode of molecular formula I as defined above, in an intercalation compound with an electrochemical potential sufficiently positive of the anode to produce a useful overall cell voltage. The greater the potential, the greater the resulting energy density. The cathode generally serves as the initial reservoir of lithium. The capacity of the cell will be limited by the amount of lithium, available for deintercalation, present in the cathode. In most cases, only a proportion of the lithium present, during fabrication of the cathode, can be reversibly deintercalated.

The non-aqueous electrolyte of the present invention can be liquid, paste-like or solid. The electrolyte includes a lithium salt, preferably with an organic solvent, and is in liquid form. Lithium salts useful for this purpose include $LiAs_6$, $LiPF_6$, $LiBF_4$, $LiClO_4$, $LiBr$, $LiAlCl_4$, $LiCF_3SO_3$, $LiC(CF_3SO_2)_3$, $LiN(CF_3SO_2)_2$, and mixtures thereof. $LiAsF_6$ should be used with caution due to its toxicity. As a water-free solvent for these salts, there can be used alone or in mixture with others an organic solvent of the group propylene carbonate, ethylene carbonate, 2-methyl tetrahydrofuran, tetrahydrofuran, dimethoxyethane, diethoxyethane, dimethyl carbonate, diethyl carbonate, methyl acetate, methylformate, $\gamma$-butyrolactone, 1,3-dioxolane, sulfolane, acetonitrile, butyronitrile, trimethylphosphate, dimethylformamide and other like organic solvents. The electrolyte solution can also contain additives such as Crown ethers eg. 12-C-4, 15-C-5, and 18-C-6, or immobilizing agents such as polyethylene oxide or inorganic gelforming compounds such as $SiO_2$, or $Al_2O_3$ such as described in U.S. Pat. No. 5,169,736, the disclosure of which is incorporated herein by reference.

DESCRIPTION OF THE PREFERRED EMBODIMENTS(S)

The novel compounds of formula are further characterized by characteristic X-ray diffraction patterns. Specifically, when $1.5 \leq x \leq 1.9$ an X-ray diffraction pattern characteristic of a hexagonal unit cell is provided. When $0.1 \leq x \leq 1.25$ an X-ray diffraction pattern characteristic of a tetragonal unit cell is provided.

More specifically, the novel compounds of Formula I can be prepared as single phase compounds over the range $0 < x < 2$. The X-ray powder diffraction patterns of phases in the range $1.5 \leq x < 2$ are similar to that of $LiCrO_2$ with the exception that the reflections are shifted to lower diffraction angles, corresponding to larger unit cell size. The magnitude of the shift increases as x decreases from 2 to 1.5. The volume of the crystallographic unit cell increases as $Mn^{+3}$, with a larger ionic radius, is substituted for $Cr^{+3}$. For example, $LiCrO_2$ has a hexagonal unit cell with a $=2.899$Å and $c=14.412$Å, and the X-ray powder diffraction pattern of $Li_2Cr_{1.5}Mn_{0.5}O_4$ can be indexed to a hexagonal unit cell with a $=2.909$Å and $c=14.442$Å. The corresponding unit cell volumes are 105.89Å$^3$ for $LiCrO_2$ and 105.84Å$^3$ for $Li_2Cr_{1.5}Mn_{0.5}O_{45}$. In both cases the unit cell contains three $LiMO_2$ units where M=Cr, Mn.

Figure 1:
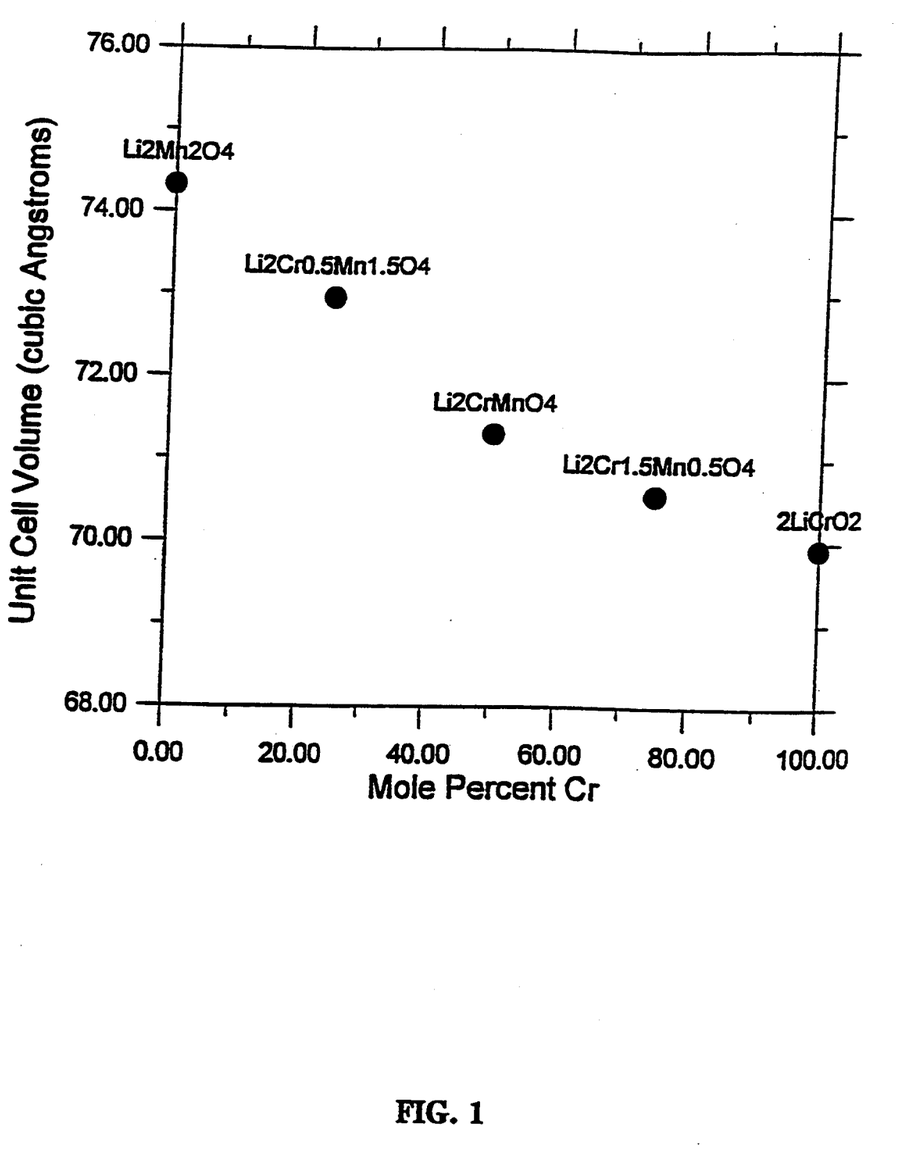
FIG. 1 is a graph demonstrating the correlation between the normalized unit cell volume as a function of composition of the novel compounds according to the invention.

The X-ray powder diffraction patterns of $Li_2Cr_xMn_{2-x}O_4$ phases over the range $0 < x \leq 1.25$ resemble the diffraction pattern of $\lambda$-$Li_2Mn_2O_4$, which has a tetragonal unit cell with an atacamite-type structure. Although the structure of these phases has not been determined in detail, the X-ray diffraction patterns can be approximately indexed to tetragonal unit cells with volumes slightly smaller than $\lambda$-$Li_2Mn_2O_4$. For example, the tetragonal unit cell of $\lambda$-$Li_2Mn_2O_4$ has dimensions a$=5.662$Å and c$=9.274$Å, whereas the X-ray powder diffraction pattern of $Li_2CrMnO_4$ can be approximately indexed to a tetragonal unit cell with a$=5.76$Å and c$=8.60$Å, and $Li_2Cr_{0.5}Mn_{1.5}O_4$ has a diffraction pattern corresponding to a tetragonal cell of approximate dimensions a$=5.71$Å and c$=8.95$Å. The true structures may be more complex or superstructures of the $\lambda$-$Li_2Mn_2O_4$-type structure. The normalized unit cell volume is defined as the crystallographic volume in cubic Angstroms, per stoichiometric unit, the stochliometric unit comprising two lithium atoms, two transition metal atoms and four oxygen atoms, wherein the transition metal atoms are chromium, manganese or a mixture thereof. The $\lambda$-$Li_2Mn_2O_4$-type unit cell contains four stoichiometric units. Thus, the normalized unit cell volume for a tetragonal $\lambda$-$Li_2Mn_2O_4$-type cell is determined by the expression $(a \times a \times c \div 4)$. FIG. 1 shows the variation in normalized unit cell volume over the full range of compositions for $Li_2Cr_xMn_{2-x}O_4$. The normalized unit cell volume decreases smoothly with increasing chromium content.

It is also noted that the electrochemical potential of $Li_2Cr_xMn_{2-x}O_4$ varies more smoothly with state of charge than does the potential of $\lambda$-$Li_{2-y}Mn_2O_4$ which has a distinct step at y$=1$.$Li_2Cr_xMn_{2-x}O_4$ has a higher average discharge potential and energy density than $\lambda$-$Li_2Mn_2O_4$.

The preferred negative electrode is based on a carbonaceous product. Suitable carbonaceous materials include:

1) carbonaceous material with a $d_{002}$ layer spacing of less than or equal to 3.70Å with true density of greater than or equal to 1.70 g/cm$^3$ prepared by carbonization of furan resins, as per U.S. Pat. No. 4,959,281.
2) the above doped with 2–5% phosphorous and oxygenated petroleum or coal pitch carbonized and doped with 2–5% phosphorous with the same $d_{002}$ layer spacing and true density, as per published European application No. EP 0 418 514.
3) carbons formed by the thermal decomposition of gas phase hydrocarbons or hydrocarbon compounds with $d_{002}$ from 3.37Å to 3.55Å as per U.S. Pat. No. 4,863,814.
4) carbon formed from mesophase microspheres with $d_{002}$ layer spacing up to 3.45Å as per U.S. Pat. No. 5,153,082.
5) commercial petroleum coke, as per U.S. Pat. No. 4,943,497.
6) isotropic graphite composed of a mixture of graphite and carbonized pitch with a degree of graphitization greater than or equal to 0.4 and heat treated fluid coke and commercial graphite whose first lithium electrochemical intercalation is performed at or above 50° C., as per U.S. Pat. No. 5,028,500. (The disclosure of the aforementioned 6 references are incorporated herein by reference).

Typical electrodes in the present invention are fabricated from 80–94 weight percent of active material, carbon coke or $Li_2Cr_xMn_{2-x}O_4$, 5–15 weight percent of a conductivity enhancer such as Super S carbon black, and 1–5 weight percent of a binder such as ethylene propylene diene monomer (EPDM).

Other conductivity enhancers such as Shawinigan Acetylene Black, graphites or other conductive materials may be used. In addition, other binders such as Teflon ®, poly(vinylidene difluoride), polyolefins or elastomers may be substituted for EPDM.

EXAMPLE 1

$Li_2Cr_{1.5}Mn_{0.5}O_4$ was prepared from 5.209 g of LiCrO$_2$ and 1.790 g of orthorhombic LiMnO$_2$. The powders were intimately mixed by hand grinding with a mortar and pestle. The mixture was then formed into several pellets in a 18 mm diameter die with an applied force of 3500 pounds. The pellets were loaded into high purity alumina crucibles and fired in a horizontal tube furnace under a flow of argon gas. The sample was fired three times, for three days each, at 100° C. and was reground between the firings. An X-ray powder pattern taken after the third firing showed only reflections indexable to a hexagonal unit cell of dimensions a=2.909(2)Å and c=14.442(5)Å.

This sample was used as the active material in the cathodes of three coin cells. The cathodes were prepared by drying a slurry made from 6.595 g of $Li_2Cr_{1.5}Mn_{0.5}O_4$ with two weight percent of ethylene propylene diene monomer (EPDM) and 10 wt. % Super S carbon black in cyclohexane. The carbon anodes were made from Conoco XP petroleum coke, with 2 wt. % of EPDM and 7.5 wt. % of Super S carbon black. Petroleum cokes are non-graphitic carbons which can intercalate up to approximately one lithium ion per twelve carbon atoms. Both the anode and cathode pellets were formed by pressing about 300–500 mg of the mixture of EPDM and carbon black coated material in a 17 mm die for 30 s with 3500 pounds of force applied by a hydraulic press. The diameter of the pellets were chosen to fit a commercial coin cell case of the type #2325. These coin cells have a diameter of 23 mm and a height of 2.5 mm, before crimping the seal. The cell stack consisted of a three layer sandwich of the cathode, a cell separator, and a carbon anode. The separator, a non-woven polypropylene felt, prevents the two electrodes from contacting directly. The separator also provides a reservoir for the electrolyte solution.

The electrolyte used was a 50/50 mixture by volume of propylene carbonate and dimethoxyethane containing 1 M $(CF_3SO_3)_2N^-Li^+$ from 3M company. The salt was dried under vacuum at 160° C. for 24 hours as recommended by the manufacturer. The propylene carbonate was vacuum distilled and the dimethoxyethane was distilled from lithium/naphalide under helium. The water content of the electrolyte was under 30 ppm as determined by Karl-Fischer titration. The cells were assembled and crimped in a helium filled glove box to prevent the electrolyte solution from reacting with ambient moisture. The coin cells were charged and discharged on custom built cyclers. The fully automated and fully programmable cyclers operate at a constant current anywhere from 0.1 µA to 100 mA, with the current controlled to 0.1 µA, or to 1 part in 4000 for higher currents. The current and voltage are measured every 30 s. The voltage can be resolved to 10 µV over the range 0 to 12 V.

In the first cell, the anode had a thickness of 0.043" and a weight of 0.325 g, which corresponds to a capacity of 54.7 mAh to a composition of LiC$_{12}$. The cathode was 0.033" thick and weighed 0.483 g which corresponds to a theoretical capacity of 124.3 mAh if all the lithium ions in the cathode can be reversibly cycled. The cell was charged at 1.8 mA to 4.0 volts consuming a capacity of 56 mAh. This capacity corresponds to the cathode material being oxidized to the composition $Li_{1.1}Cr_{1.5}Mn_{0.5}O_4$ and represents a capacity density of 132 mAh/g of $Li_2Cr_{1.5}Mn_{0.5}O_4$. It also represents a nominal depth of charge on the anode of 102%. However, some of the anode reaction is known to be irreversible, and is assumed not to be lithium intercalation.. On discharging the cell to 2.0 volts at 1.8 mA, a capacity of 31 mAh was achieved with an average cell voltage of around 3.2 volts. By the 24th cycle at 1.8 mA, the reversible capacity had decreased to 23.3 mAh. Reducing the current to 0.45 mA resulted in an increase in the reversible capacity to 36 mAh. After an additional five cycles at 0.45 mA, the cell has a reversible capacity of 32.5 mAh between 2.0 and 4.0 volts.

Figure 2:
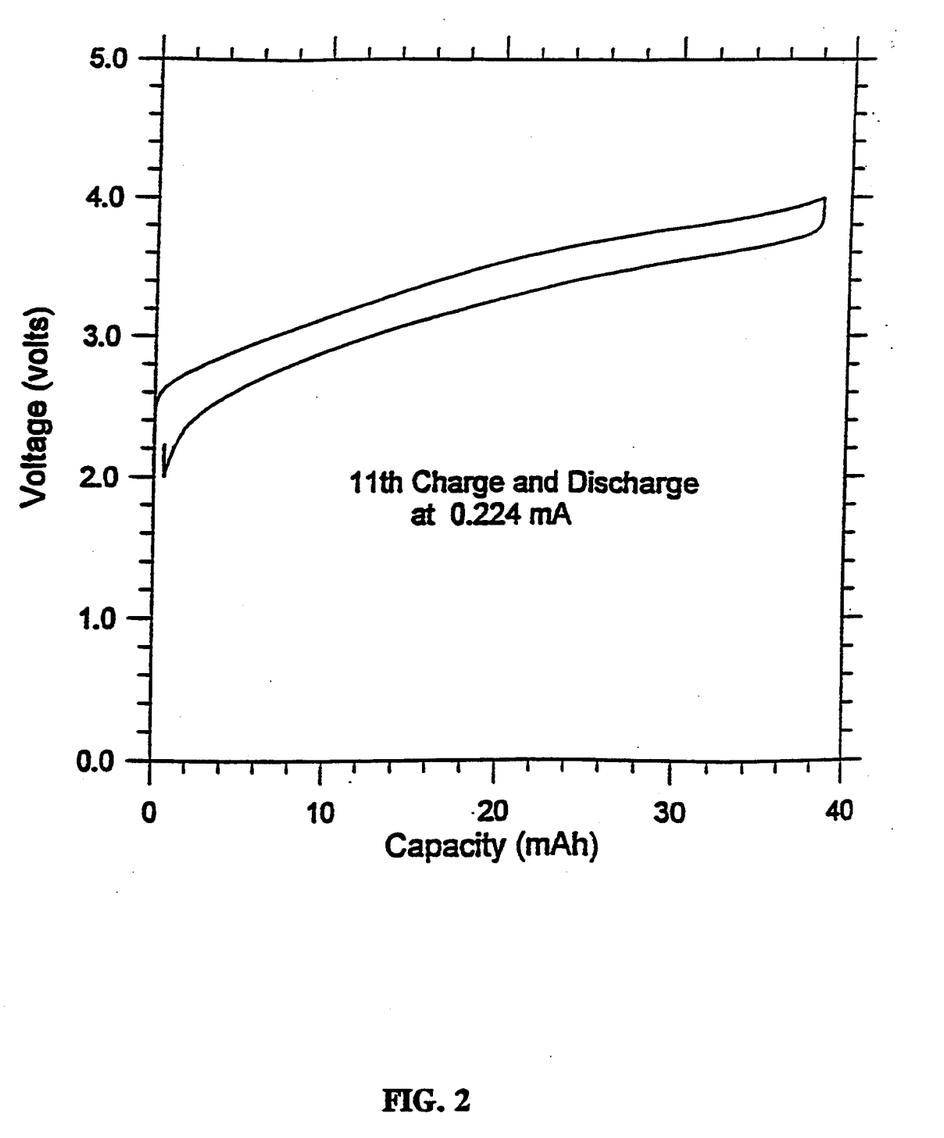
FIGS. 2 to 4 are graphs illustrating the capacity of secondary lithiumion electrochemical cells, using cathodes of the novel compounds of the invention.

A second cell was built with a 0.040" thick anode weighing 0.302 g, and a 0.036" thick cathode weighing 0.495 g. This corresponds to an anode capacity of 50.8 mAh to LiC$_{12}$ and a cathode capacity of 127.4 mAh assuming all the lithium in the cathode can by cycled. The cell was charged at 1.8 mA to 4.0 volts consuming a capacity of 53 mAh. This capacity corresponds to a 42% depth of charge on the cathode or an end of charge composition of $Li_{1.16}Cr_{1.5}Mn_{0.5}O_4$. The first discharge produced 31 mAh to a limit of 2.0 volts at a current of 1.8 mA. A subsequent cycle at 0.45 mA resulted in a discharge capacity of 44 mAh, which is a capacity density of 101 mAh/g of $Li_2Cr_{1.5}Mn_{0.5}O_4$. A typical charge and discharge cycle for this cell is shown in FIG. 2.

The third cell was assembled with a 0.053" thick anode weighing 0.391 g, and a 0.021" cathode weighing 0.269 g. The cell required 38.1 mAh to charge to 4.0 V at 0.45 mA. The first charge pushed the cathode to a 55% depth of discharge. The cell delivered 24.2 mAh at 0.45 mA on the subsequent discharge to a voltage cutoff of 1.2 V. Thus, the capacity density of active cathode material, $Li_2Cr_{1.5}Mn_{0.5}O_4$, for the charge and discharge were 161 mAh/g and 102 mAh/g, respectively.

EXAMPLE 2

Two batches of $Li_2CrMnO_4$ were combined to prepare the cathode mixture which was evaluated in coin cells. The first sample was prepared by mixing 0.771 g of LiCrO$_2$ with 0.798 g of orthorhombic LiMnO$_2$. The powders were intimately mixed by hand grinding with a mortar and pestle. The mixture was then formed into several pellets in a 18 mm diameter die with an applied force of 3500 pounds. The second sample of $Li_2CrMnO_4$ was prepared by combining 0.798 g of $Li_2CO_3$ with 0.823 g of $Cr_2O_3$ and 0.937 g of $MnO_2$. The powders were ground and pelletized, as above. The pelletized samples were loaded into separate high purity alumina crucibles and fired in a horizontal tube furnace under a flow of argon gas. For the first firing, the furnace was held at 600° C. for 3 hours to decompose the $Li_2CO_3$ and then raised to 100° C. and held at that temperature for 4 days. The samples were cooled to 200° C. in the furnace under argon. X-ray powder diffraction patterns were obtained for both samples after the first firing. The patterns were very similar, but the diffraction peaks were broad. The samples were fired two more times, for three days each, at 100° C. and were reground between the firings. X-ray powder patterns taken after the third firing showed both samples to have virtually identical diffraction patterns but the reflections were still somewhat broad. The diffraction peaks were approximately indexable to a tetragonal unit cell of dimensions a=5.76Å and c=8.60Å.

The two samples were combined and used as the active material in the cathodes of three coin cells. The cathodes were prepared by mixing 3.084 g of Li$_2$CrMnO$_4$ with 2 wt. % EPDM and 10 wt. % Super S carbon black. The anodes were made from petroleum coke, with 2 wt. % of EPDM and 7.5 wt. % of Super S carbon black. Both the anode and cathode pellets were formed in the same manner as those for the $Li_2Cr_{1.5}Mn_{0.5}O_4$ cells, and the same electrolyte solution, and cell assembly procedure, was used. The first cell had a 0.320 g anode of 0.042" thickness, and a 0.033" thick cathode weighing 0.384 g. The cell required 53.1 mAh to charge to 4.0 V at 1.8 mA. This corresponds to a 54% depth of charge on the cathode, or a capacity density of 157 mAh/g of $Li_2CrMnO_4$. The subsequent discharge to 1.8 V at 1.8 mA yielded 30.6 mAh. After a rest period the cell was discharged again at 0.45 mA to 1.8 V which produced a further 3.9 mAh for a total of 34.5 mAh. Later cycles at 0.45 mA produced a reversible discharge capacity of 39.5 mAh.

Figure 3:
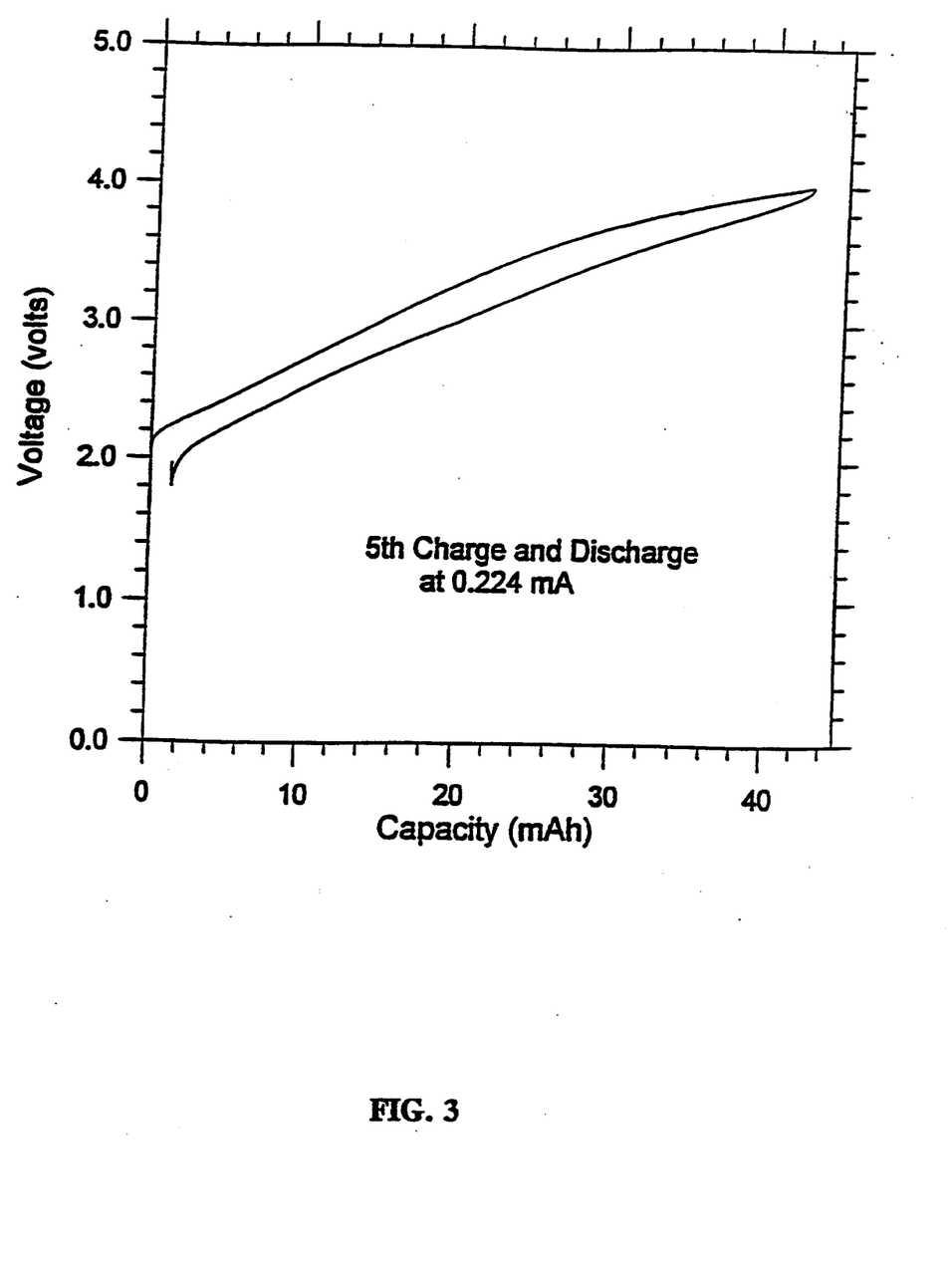

The second cell had a 0.042" thick anode weighing 0.316 g and a cathode of 0.034" thickness weighing 0.383 g. The cell was charged at 1.8 mA to a capacity limit of 49 mAh which corresponds to 50% depth of charge on the cathode. The cell reached the capacity limit at a voltage of 3.9 V. The first discharge at 1.8 mA yielded 26.8 mAh to 1.8 V. After a rest period, the cell was discharged a further 6.8 mAh at 0.18 mA to 1.8 V. Subsequent cycles at 0.225 mA produced a reversible capacity of 43 mAh. This represents a 44% depth of discharge on the cathode, or a capacity density of 127 mAh/g of $Li_2CrMnO_4$. FIG. 3 shows a typical charge and discharge cycle for this cell.

The third cell was assembled with a 0.052" thick anode weighing 0.369 g and a 0.022" thick cathode weighing 0.252 g. The first charge at 0.45 mA to 4.0 V required 47.4 mAh. This capacity represents a 73.5% depth of charge on the cathode and a capacity density of 214 mAh/g of $Li_2CrMnO_4$. The subsequent discharge at 0.45 mA produced 30.1 mAh to a 1.2 V limit, with almost all of the capacity being achieved above 1.9 V. After a period of rest, the cell was discharge again at 0.23 mA to 1.2 V, providing a further 1.6 mAh. The total discharge capacity, 31.7 mAh, corresponds to a 49% depth of discharge on the cathode and to a reversible capacity density of 1433 mAh/g of $Li_2CrMnO_4$.

EXAMPLE 3

$Li_2Cr_{0.5}Mn_{1.5}O_4$ was prepared from 1.898 g of $LiCrO_2$ and 5.874 g of orthorhombic $LiMnO_2$. Finely ground powders of the reagents were intimately mixed and pelletized. Then they were fired in high purity alumina crucibles in a horizontal tube furnace under a flow of inert gas. The furnace was held at 600° C. for 4 hours before heating and holding it at 100° C. for 3 days. Three further annealings at 1000° C. for 2 to 3 days each were required to obtain an X-ray diffraction pattern with moderately sharp peaks. The sample was reground between each firing. The X-ray diffraction pattern of the final product could be indexed to a tetragonal unit cell of approximate dimensions $a=5.71$Å and $c=8.95$Å.

Figure 4:
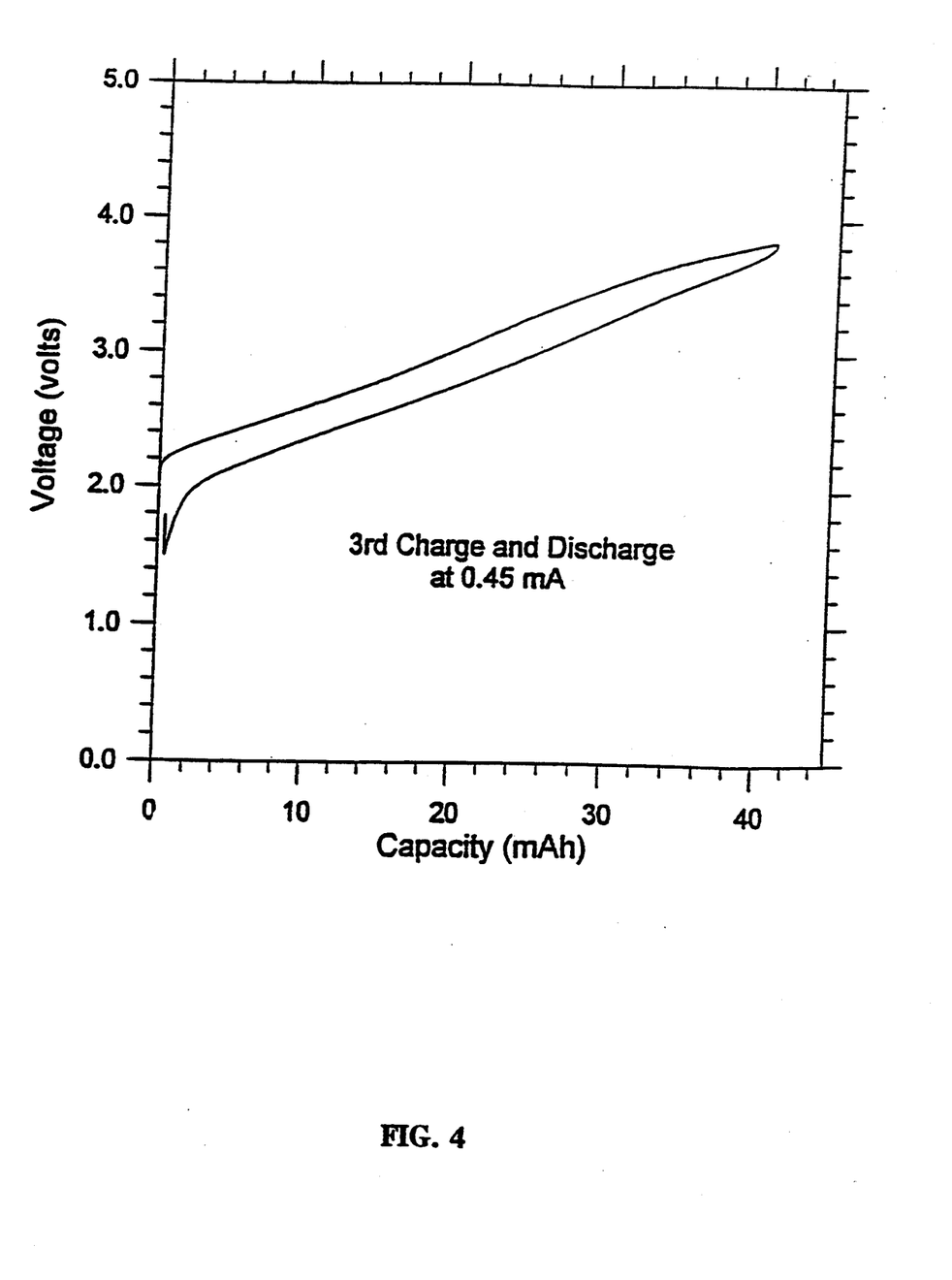

Two coin cells were built, in the same manner as described above, with cathodes fabricated from $Li_2Cr_{0.5}Mn_{1.5}O_4$ and petroleum coke anodes. The cathode mixture was prepared from 5.113 g of $Li_2Cr_{0.5}Mn_{1.5}O_4$ with 2 wt. % EPDM and 10 wt. % Super S carbon black. The first cell had a 0.045" thick anode weighing 0.355 g, and a 0.418 g cathode which was 0.031" thick. A capacity of 64.2 mAh was required to charge the cell to a 60% depth of charge on the cathode. The cell was charged at 0.45 mA and reached the required capacity at a potential of 3.83 V. On being discharged to 1.5 V at 0.45 mA, the cell produced 41.4 mAh, with almost all the capacity being delivered above 2.0 V. A typical charge and discharge cycle for this cell is shown in FIG. 4.

The second cell had a 0.374 g cathode of 0.026" thickness and a 0.049" thick anode weighing 0.398 g. A capacity of 72.3 mAh was needed to charge the cell to 4.0 V at 0.45 mA. This corresponds to a 75% depth of charge on the cathode, or a capacity density of 217 mAh/g of $Li_2Cr_{0.5}Mn_{1.5}O_4$. A capacity of 49 mAh was recovered on the subsequent discharge at 0.45 mA to 1.5 V.

We claim:

1. A single phase compound of molecular formula I $$Li_2Cr_xMn_{2-x}O_4 \qquad I$$

wherein $0<x<2$, having an X-ray powder diffraction pattern indexable to a crystallographic unit cell with a normalized unit cell volume of greater than 69.9 and less than 74.3 cubic Angstroms.

2. A compound according to claim 1, wherein $0.1 \leq x \leq 1.9$.

3. A compound according to claim 1, wherein $0.1 \leq x \leq 1.5$.

4. A compound according to claim 1, wherein $1.5 \leq x \leq 1.9$, further characterized by an X-ray powder diffraction pattern indexable to a hexagonal unit cell.

5. A compound according to claim 1, wherein $0.1 \leq x \leq 1.25$, further characterized by an X-ray powder diffraction pattern indexable to a tetragonal unit cell.

6. A cathode for use in a secondary lithium ion electrochemical cell, comprising as active material a compound of formula I as defined in claim 1.

7. A cathode according to claim 6, wherein the compound of Formula I, $0.1 \leq x \leq 1.9$.

8. A secondary lithium ion electrochemical cell comprising, a lithium intercalation anode, a suitable non-aqueous electrolyte including a lithium salt, a cathode as defined in claim 6, and a separator between the anode and cathode.

9. An electrochemical cell according to claim 8, wherein the anode comprises a material selected from the group consisting of transition metal oxides, transition metal sulfides and carbonaceous materials, and wherein the electrolyte is in liquid form and includes a suitable organic solvent.

10. An electrochemical cell according to claim 9, wherein the lithium salt is selected from the group consisting of $LiAsF_6$, $LiPF_6$, $LiBF_4$, $LiClO_4$, LiBr, $LiAlCl_4$, $LiCF_3SO_3$, $KLiC(CF_3SO_2)_3$, $LiN(CF_3SO_2)_2$, and mixtures thereof.

11. An electrochemical cell according to claim 10, wherein the organic solvent is selected from the group consisting of propylene carbonate, ethylene carbonate, 2-methyl tetrahydrofuran, tetrahydrofuran, dimethoxyethane, diethoxyethane, dimethyl carbonate, diethyl carbonate, methyl acetate, methylformate, γ-butyrolactone, 1,3-dioxolane, sulfolane, acetonitrile, butyronitrile, trimethylphosphate, dimethylformamide and other like organic solvents and mixtures thereof.

12. An electrochemical cell according to claim 11, wherein the anode comprises a carbonaceous material.

13. An electrochemical cell according to claim 12, wherein the anode comprises petroleum coke.

14. An electrochemical cell according to claim 13, wherein the electrolyte comprises 1 M $LiN(CF_3SO_2)_2$ in a 50/50 mixture by volume of propylene carbonate and dimethoxyethane.

15. An electrochemical cell according to claim 14, wherein formula I, $0.1 \leq x \leq 1.9$.

16. A single phase compound of molecular formula I $$Li_2Cr_xMn_{2-x}O_4 \qquad I$$

wherein $0 < x < 2$, and wherein $1.5 \leq x \leq 1.9$, further characterized by an X-ray powder diffraction pattern indexable to a hexagonal unit cell having dimensions a = 2.899 to 2.909Å and c = 14.412Å to 14.442Å, and wherein $0.1 < x < 1.25$, further characterized by an X-ray powder diffraction pattern indexable to a tetragonal unit cell having dimensions a = 5.662Å to 5.76Å and c = 9.274Å to 8.60Å.

* * * * *

UNITED STATES PATENT AND TRADEMARK OFFICE
CERTIFICATE OF CORRECTION

PATENT NO. : 5,370,949
DATED : December 6, 1995
INVENTOR(S) : I. Davidson et al

It is certified that error appears in the above-identified patent and that said Letters Patent is hereby corrected as shown below:

On the cover page, item [56] under OTHER PUBLICATIONS "Su" should read --Sc--.

At column 2, line 30 "$Li_2Cr_{Mn2-x}O_4$" should read --$Li_2Cr_xMn_{2-x}O_4$--

At column 3, line 55 "105.89Å³" should read --104.89Å³--

At column 5, line 11 "100°C" should read --1000°C--

At column 6, line 52 "100°C" should read --1000°C--

At column 6, line 58 "100°C" should read --1000°C--

At column 7, line 42 "1433" should read --143--

At column 7, line 51 "100°C" should read --1000°C--

At column 8, line 52 "$KLiC(CF_3SO_2)_3$" should read --$LiC(CF_3SO_2)_3$--

At column 9, line 5 "AS" should read --A--

At column 10, line 5 "0.1<x<1.25" should read --0.1≤x≤1.25

Signed and Sealed this

Ninth Day of May, 1995

*Attest:*

BRUCE LEHMAN

*Attesting Officer*   *Commissioner of Patents and Trademarks*